United States Patent
Godman et al.

(10) Patent No.: US 10,459,892 B2
(45) Date of Patent: Oct. 29, 2019

(54) FILESYSTEM HIERARCHICAL AGGREGATE METRICS

(71) Applicant: Qumulo, Inc., Seattle, WA (US)

(72) Inventors: Peter Godman, Seattle, WA (US);
Kevin O'Neill, Seattle, WA (US);
Thomas Urban, Seattle, WA (US);
Justin Husted, Seattle, WA (US);
Graeme Williams, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 551 days.

(21) Appl. No.: 14/595,043

(22) Filed: Jan. 12, 2015

(65) Prior Publication Data

US 2015/0310034 A1 Oct. 29, 2015

Related U.S. Application Data

(60) Provisional application No. 61/982,926, filed on Apr. 23, 2014, provisional application No. 61/982,931, filed on Apr. 23, 2014.

(51) Int. Cl.
*G06F 16/185* (2019.01)
*G06F 16/23* (2019.01)
*G06F 9/46* (2006.01)

(52) U.S. Cl.
CPC ........ *G06F 16/185* (2019.01); *G06F 9/467* (2013.01); *G06F 16/2358* (2019.01)

(58) Field of Classification Search
CPC ........ G06F 17/30221; G06F 17/30368; G06F 9/467; G06F 16/185; G06F 16/2358
USPC ................................ 707/831, 829, 828, 956
See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |
| 5,953,719 A | 9/1999 | Kleewein et al. |
| 6,496,944 B1 * | 12/2002 | Hsiao ............. G06F 11/1435 714/15 |

(Continued)

FOREIGN PATENT DOCUMENTS

WO    0072201 A1    11/2000

OTHER PUBLICATIONS

Office Communication for U.S. Appl. No. 14/859,114 dated Jul. 24, 2017, pp. 1-49.

(Continued)

*Primary Examiner* — Robert W Beausoliel, Jr.
*Assistant Examiner* — Pedro J Santos
(74) *Attorney, Agent, or Firm* — John W. Branch; Lowe Graham Jones PLLC

(57) ABSTRACT

A software and hardware facility persistently maintains metrics on directories at different levels within a tree of a filesystem. The facility hierarchically aggregates attributes of files contained by directories and stores them as metric values in each directory within a tree. The stored values represent summed or otherwise aggregated data from the descendant directories and files. The metric values represent aggregated attributes such as total space consumed by a directory and all the descendant directories and files, total number of files within a directory, total data blocks used by a directory and its descendant directories and data files, etc.

21 Claims, 14 Drawing Sheets

(56) References Cited

U.S. PATENT DOCUMENTS

| | | | |
|---|---|---|---|
| 6,965,903 B1 | 11/2005 | Agarwal et al. | |
| 8,296,312 B1* | 10/2012 | Leung | G06F 17/30109 |
| | | | 707/760 |
| 8,504,733 B1 | 8/2013 | Iyer et al. | |
| 9,143,379 B1 | 9/2015 | Berger et al. | |
| 2002/0083073 A1 | 6/2002 | Vaidya et al. | |
| 2003/0145009 A1 | 7/2003 | Forman et al. | |
| 2005/0027748 A1* | 2/2005 | Kisley | G06F 11/2074 |
| 2005/0119996 A1 | 6/2005 | Ohata et al. | |
| 2007/0027985 A1 | 2/2007 | Ramany et al. | |
| 2007/0100855 A1* | 5/2007 | Kohl | G06F 17/30235 |
| 2008/0059399 A1* | 3/2008 | DeLorme | G06F 17/30067 |
| 2008/0250357 A1 | 10/2008 | Lee et al. | |
| 2008/0270469 A1 | 10/2008 | Myerson et al. | |
| 2008/0282244 A1 | 11/2008 | Wu et al. | |
| 2008/0313217 A1* | 12/2008 | Dunsmore | G06F 17/30067 |
| 2009/0274047 A1 | 11/2009 | Kruys et al. | |
| 2009/0319566 A1 | 12/2009 | Wald et al. | |
| 2010/0217948 A1 | 8/2010 | Mason et al. | |
| 2011/0066668 A1* | 3/2011 | Guarraci | G06F 17/30233 |
| | | | 707/831 |
| 2011/0125973 A1 | 5/2011 | Lev et al. | |
| 2011/0246724 A1 | 10/2011 | Marathe et al. | |
| 2012/0036463 A1 | 2/2012 | Krakovsky et al. | |
| 2014/0040693 A1 | 2/2014 | Kim et al. | |
| 2014/0281411 A1 | 9/2014 | Abdallah | |
| 2015/0067086 A1 | 3/2015 | Adriaens et al. | |
| 2015/0067142 A1 | 3/2015 | Renkema | |
| 2015/0278282 A1 | 10/2015 | Sardina et al. | |
| 2016/0371297 A1 | 12/2016 | Okun et al. | |
| 2016/0380878 A1 | 12/2016 | Bugenhagen et al. | |

OTHER PUBLICATIONS

Office Communication for U.S. Appl. No. 14/595,598 dated Dec. 15, 2017, pp. 1-18.
Office Communication for U.S. Appl. No. 14/658,015 dated Jan. 4, 2018, pp. 1-28.
Office Communication for U.S. Appl. No. 14/859,114 dated Feb. 21, 2018, pp. 1-25.
Office Communication for U.S. Appl. No. 14/595, 598 dated Feb. 24, 2017, pp. 1-8.
Office Communication for U.S. Appl. No. 14/658,015 dated Apr. 27, 2017, pp. 1-7.
Office Communication for U.S. Appl. No. 14/859,114 dated May 11, 2018, pp. 1-5.
Office Communication for U.S. Appl. No. 14/595,598 dated Apr. 19, 2018, pp. 1-3.
Office Communication for U.S. Appl. No. 14/859,114 dated Jun. 27, 2018, pp. 1-39.
Office Communication for U.S. Appl. No. 15/957,809 dated Jun. 28, 2018, pp. 1-33.
Office Communication for U.S. Appl. No. 14/658,015 dated Jul. 13, 2018, pp. 1-14.
Office Communication for U.S. Appl. No. 14/595,598 dated Sep. 20, 2018, pp. 1-18.

* cited by examiner music-a — 902

Dashboard | Analytics ▼ | Sharing ▼ | Cluster ▼

Qumulo QEFS | Signed in as admin
Friday, September 26, 2014
11:54 AM
America/Los Angeles

Integrated Analytics

In view: /

Name — 904
/
Size — 906  Used      Overall
277.5 GB   99.7%     5.69%
Permissions
0777
Created — 908   Last Modified — 910
09/15/2014       09/26/2014
2:31 PM   912    11:02 AM — 916
Directories      Files — 914
8288             56877

Top IOPS Activity
84.32  /user/john/company_remote/src/
       lm_not_quite_the_fastest
15.53  /music/bob/BIG_FILE_2
10.08  /music/zed/mp3/musician1/
       music_for_airports/.musician1-
       music_for_airports-01-
       1_1.mp3.pvctrxZ
7.85   /music/bob/ALAC/musician2/
       album1/07 - song.m4a
5.13   /music/bob/ALAC/musician2/
       album1/06 - song.m4a
4.55   /music/bob/ALAC/musician2/
       album1/05 - song.m4a IOPS: Namespace ☑Reads ☑Writes    File ☑Reads ☑Writes
                    920                         922

918 {

| / | | |
|---|---|---|
| music 926 | zed | mp3 | [More] |
| | john | shared music library | TV Shows / Compilations |
| | jane | Music | [More] |
| | bob 930 | BIG_FILE_2 / ALAC / BIG_FILE | Compilations / [More] |
| [More] | | [More] |

FILESYSTEM HIERARCHICAL AGGREGATE METRICS

CROSS-REFERENCE TO RELATED APPLICATION(S)

This application claims the benefit of provisional application Nos. 61/982,926 and 61/982,931, both filed on Apr. 23, 2014, each of which is hereby incorporated by reference in its entirety.

TECHNICAL FIELD

The described technology is directed to the field of filesystems.

BACKGROUND

The demand for scalable storage resources and the ability to provide rapid access to content stored thereby is a key concern to end-users. Enterprises, businesses, and individuals alike now use large scale filesystems to store data that is remotely accessible via a network. Such filesystems are often accessible via closed (e.g., enterprise) and open (e.g., Internet) networks and allow concurrent access via multiple client devices. Various implementations of large scale filesystems relying on network access have been developed. The primary differences between such filesystems are (1) that they use different protocols for the client devices and servers to communicate to read and write data and (2) that the data and corresponding metadata are stored in different ways.

For some filesystems, the protocol provides access to end-users by implementing APIs through a network, while others are specific to operating systems. Some such operating systems include default programs which may be called to synchronously determine and display filesystem information to an end-user. For example, Unix includes a .du program which return file space usage of a directory.

Users benefit from knowing the amount of storage resources as well as the allocation of those resources to various portions of the filesystem, such as directories, subdirectories, and files in a filesystem hierarchy, in order to facilitate management of the filesystem. For example, administrators can allocate system resources to frequently accessed nodes and can determine if additional storage capacity is required.

Systems administrators find useful various kinds of filesystem queries. For example, on system administrator may wish to generate a list of all files created in the past hour.

BRIEF DESCRIPTION OF THE DRAWINGS

FIG. 9 is a display diagram showing an interactive GUI provided by the facility that indicate metric values for directories of a filesystem hierarchy.

DETAILED DESCRIPTION

Figure 1:
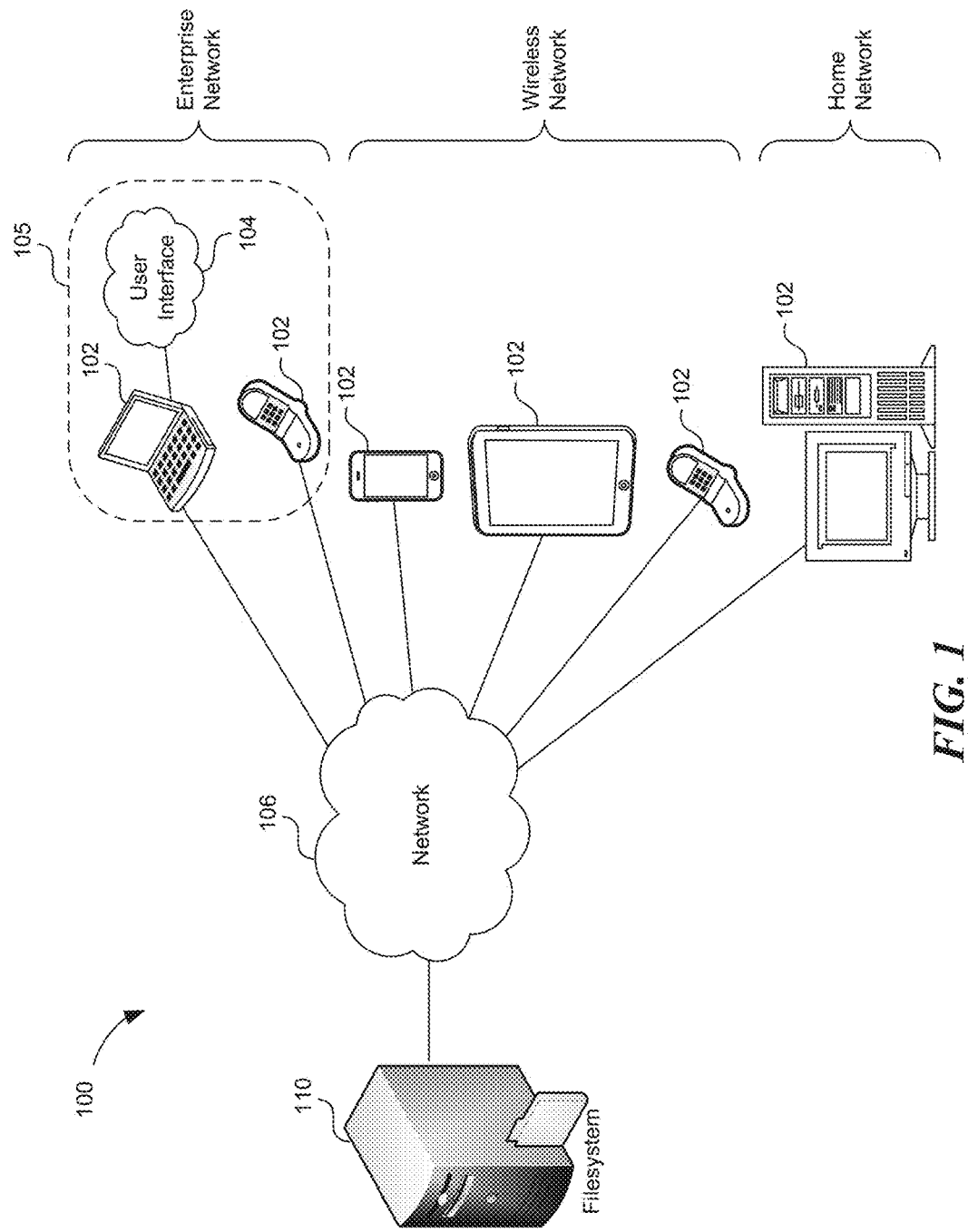
FIG. 1 shows an environment in which the facility operates.

The inventors have recognized that conventional filesystems incur significant latency in aggregating metadata attributes of files to obtain hierarchical aggregate metric values ("metric values") that provide a user with visibility into the filesystem. Traditionally, in tree-structured filesystems, in order to satisfy a request for metrics for a subtree of the filesystem, it has been necessary to systemically and recursively traverse an entire subtree in response to the request. The tree-structured filesystems discussed herein comprise a hierarchical tree of filesystem objects—directories and files—that include a root directory. Each filesystem object contains inode data that includes filesystem administration information. The filesystem object may be directly accessed by the filesystem via filesystem path or address, and the data contained in the inode data may be used by the filesystem to manage the hierarchy.

For example, if a user wants to know how much storage capacity is available in a particular user space, such as in a subtree of the filesystem hierarchy contained by a directory, a conventional filesystem must synchronously aggregate a file size metadata attribute value for each file in each filesystem object in the subtree to return the aggregated value to the user. In another example, if the user wants to know how much storage is dedicated to .crw files in the filesystem, conventional filesystems must synchronously check each file's type and aggregate the size of each that is a .crw file. Not only is does this create an imbalance in system performance, but it imposes a high cost in terms of number of I/O operations. More importantly, it may take hours to return the requested value to the user, depending on the size of the filesystem and its hardware components.

In addition, for conventional filesystems in which numerous users concurrently access the files, the returned values may fail to reflect any modifications to data that occur during the slow scan. Using the prior example, a second user may access the system and delete 2 TB (terabytes) of .crw files in a particular directory. However, if the scan accesses the directory containing those files prior to the deletion and returns the result subsequent to the deletion, that result is inaccurate and will fail to reflect the modified data.

To avoid latency, performance fluctuations, increased I/O costs, and other issues, the inventors have determined that it is desirable to maintain for each directory in a filesystem tree, persistent hierarchical aggregates "metric values" for file attributes of the filesystem objects contained by the subtree defined by that directory. Accordingly, a request for such metrics for a particular subtree can be satisfied without exhaustively traversing each level of the subtree of the filesystem tree structure in response.

A software and hardware facility described herein ("the facility") addresses these issues by persistently maintaining metrics on directories at different levels within a filesystem tree. The facility may operate with respect to a distributed or monolithic filesystem, such as one maintained by a number of networked nodes in a cluster. In particular, in some embodiments, the facility aggregates attributes of filesystem objects and stores them as metric values in each directory within a tree. In some embodiments, the values stored in a directory represent data summed or otherwise aggregated from filesystem objects contained by an entire subtree of filesystem objects—directories and files—defined by that directory. In some embodiments, the metric values may represent such measures as total space consumed by a filesystem object and all the descendant objects, total number of files within an filesystem object, total data blocks used by a filesystem object and its descendant filesystem objects (if any), etc.

In some embodiments, the metrics stored in a directory containing no other directories is determined by performing an aggregation or other logical operation on attributes of the files contained by the directory. In some embodiments, the metrics stored in other directories are each determined by performing an aggregation or other logical operation on the attributes of the files contained by the directory itself, further aggregated with the corresponding metrics of the child directories. For example, metric values may provide: a most recently accessed filesystem object including all its descendant objects, a most frequently accessed filesystem object in a tree or subtree, a largest filesystem object in set of objects in a tree or subtree, and the like.

By performing in some or all of the ways described above, the facility enables rapid access to metric values based on file attributes and aggregates stored at various levels in the filesystem. Because the metric values for those attributes are maintained in each directory and are updated frequently, the facility typically does not need to traverse significant portions of the filesystem tree in order to determine corresponding metric value.

FIG. 1 illustrates an environment 100 in which the facility may operate. For example, a filesystem may communicate over a network 106, such as the Internet, with computing systems, e.g., clients 102, through a secondary network. In particular, the user executes a browser program on a client in order to display the contents of a user interface which may be used to generate and execute requests to access the facility, e.g., filesystem 110. In some embodiments, a secondary network may include an enterprise network, wireless network, or home network on which the client is operating. Any number of proxy servers or gateway devices may be additionally included in the communication path between the facility 110 and the client 102, though not specifically shown in the illustrated environment. In various embodiments, a variety of computing systems or other devices may be used as a client computer systems, such as mobile phones, personal digital assistants, tablet computers, etc.

In various embodiments, the facility includes computer systems and devices including zero or more of each of the following: a central processing unit ("CPU") for executing computer programs; a computer memory for storing programs and data while they are being used, including the facility and associated data, an operating system including a kernel, and device drivers; a persistent storage device, such as a hard drive or flash drive for persistently storing programs and data; a computer-readable media drive, such as a floppy, CD-ROM, or DVD drive, for reading programs and data stored on a computer-readable medium; and a network connection for connecting the computer system to other computer systems to send and/or receive data, such as via the Internet or another network and its networking hardware, such as switches, routers, repeaters, electrical cables and optical fibers, light emitters and receivers, radio transmitters and receivers, and the like.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
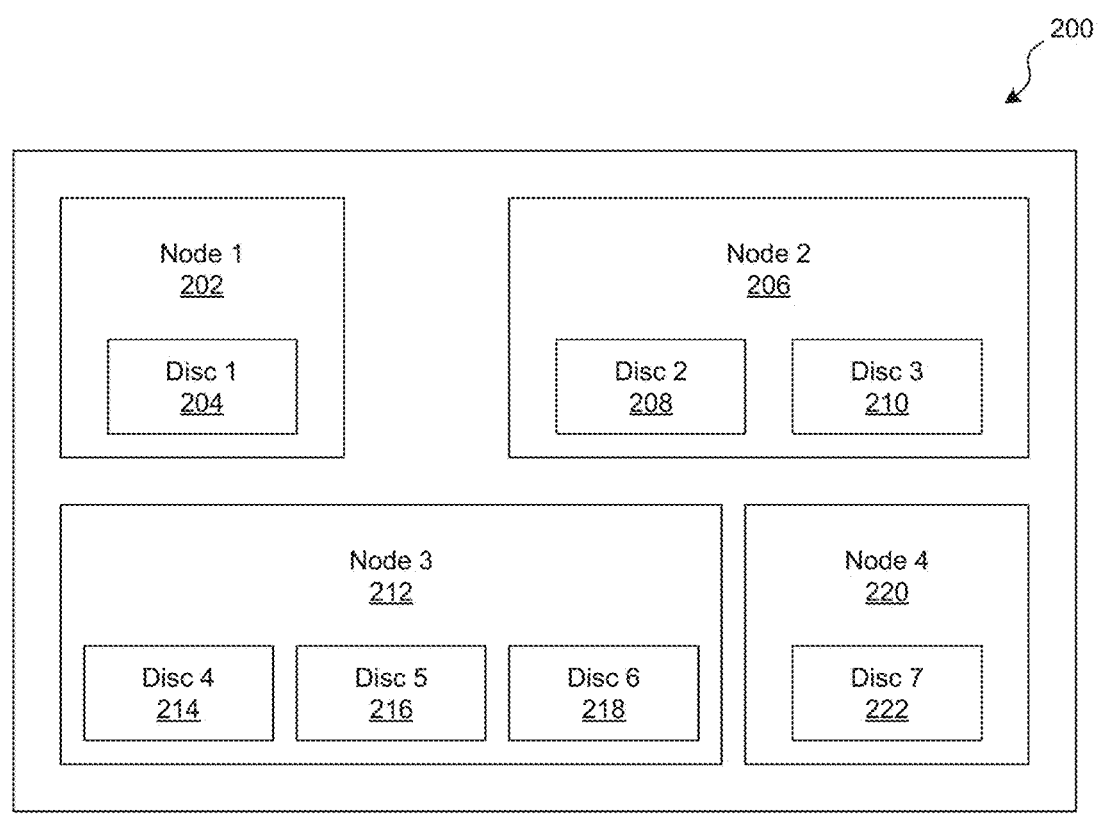
FIG. 2 is a block diagram illustrating a cluster of storage devices operated by the facility.

FIG. 2 is a block diagram of cluster 200 in a distributed filesystem in which numerous storage devices may be networked together for use in connection with the facility. One or more storage devices additionally may be coupled together in groups, forming nodes (e.g., Node 1 202, Node 2 206, Node 3 212, Node 4 220) within the facility. Each node within the cluster 300 has a particular address, or path name accessible via the network filesystem protocol, an instance of which is included on each node. Accordingly, each node in the cluster 200 typically includes one or more computer processors or controllers and data storage devices such as hard disks, solid state disk drives, or similar computer readable storage or memory devices. For example, a node may include one or more server computers themselves, contained by such components. Each of the data storage devices (e.g., disc1 204, disc2 208, etc.) within a node may store data in blocks, the stored data corresponding to files contained by filesystem object data of the hierarchical tree structures implemented by the facility.

Figure 3:
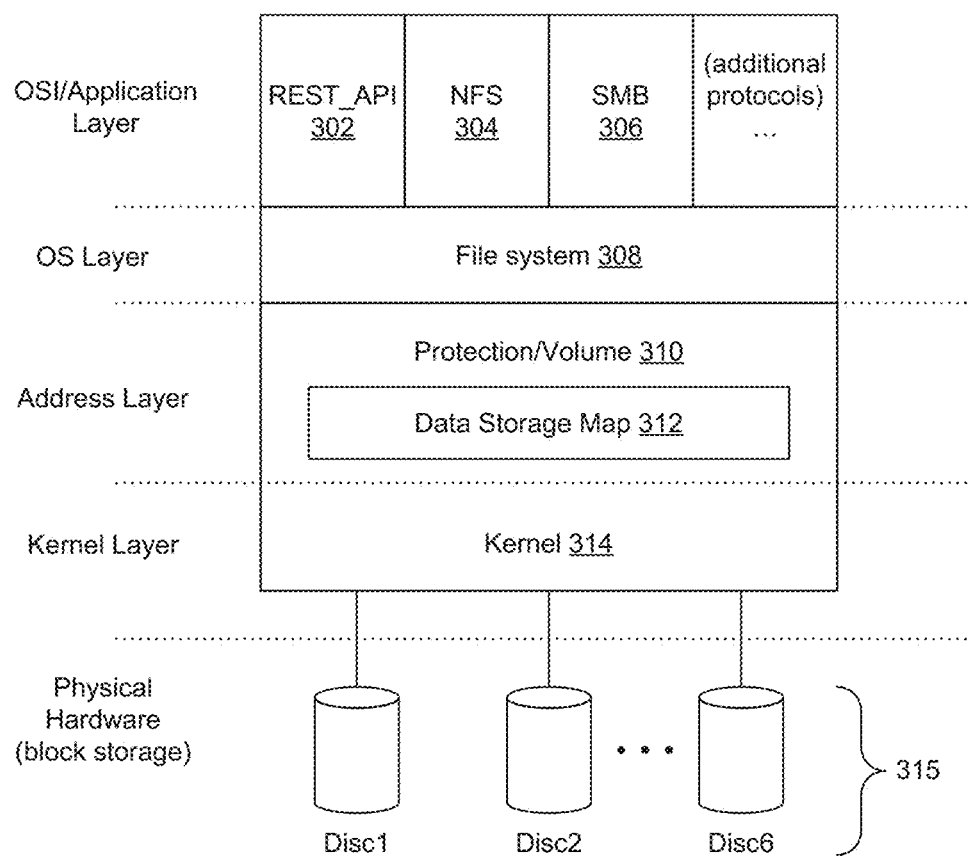
FIG. 3 is an abstraction level diagram of the facility.

FIG. 3 illustrates abstraction layers provided by the facility in some embodiments. For example, the layers can include an application layer, an operating system layer (OS) that includes a host (local) filesystem, an address abstraction layer that includes a protection/volume 310 (e.g., a protected storage unit) referenced by the local filesystem 308 and a kernel layer that translates requests from the OS layer and an address provided by the address layer.

The application layer of the facility exposes an instance of a web application programming interface (API) 302 (e.g., REST), a network filesystem protocol 304 (NFS), and an application layer network protocol 306 (e.g., SMB). The NFS protocol 304 is an application level protocol used to access the facility over a network, such as the Internet. The application layer network protocol 306 may be used to communicate with other nodes in the facility, accessible by the NFS 304. In some embodiments, the application layer includes protocols such as http, ftp, scp, rsync, afp, afs, or any other application layer protocol capable of providing network-level access to the facility. Any of the aforementioned protocols are considered reasonable variations to the illustrated protocols and may be used in addition to or in place of those protocols.

An OS layer implements a core filesystem 308. To access stored data, the core filesystem 308 references a location (e.g., in a protected storage unit) which is used by the address abstraction layer to retrieve the requested data. Accordingly, the address abstraction layer can include a data storage map 312 that links the referenced location to a particular node and associated disc (e.g., see FIG. 2) on which the requested data is stored.

The facility also includes the kernel layer that translates the filesystem call (for the requested data) into instructions for hardware components. The hardware components may be located in a hardware layer and may include a plurality of storage devices 315 (e.g., disc1, disc2, disc3) that can be distributed across multiple storage nodes.

In some embodiments, the facility manages metric requests for filesystem objects through the web API 302. These requests are stateless in order to account for various platforms on which filesystem may be implemented. Accordingly, calls made from a client device, such as devices 102 in FIG. 1, can request a metric value to be retrieved for one or more filesystem objects stored by the facility. Exemplary metric value requests in some embodiments are provided in the following table:

| | |
|---|---|
| capacity_usage | total blocks used for file data (not metadata) |
| moving_capacity_usage | moving sum of capacity_usage (exponentially decayed, 60 minute lifetime) |
| num_directories | total directory count under the filesystem object |
| num_files | total file count under the filesystem object |
| num_input_operations | total number of write operations on files |
| moving_input_operations | moving sum of num_input_operations (exponentially decayed, 60 minute lifetime) |

Each of the metric requests within the table typically returns a value indicating an aggregate value of attributes for a collection of files contained by a directory within the facility. In some embodiments, the metric requests return integer values for aggregated attributes of a file in the facility. The capacity usage and the moving capacity usage may be in units of bytes and, in some embodiments, include 4096-byte data blocks. Some of the metrics maintained by the facility are aggregations on filesystem object attributes of types other than integer. For example, in some embodiments, the facility maintains a recent access ("raccess") time metric based on applying a latest( ) aggregation function to an access time ("atime") attribute maintained for each descendant filesystem object. In some embodiments, the metrics are checksums.

When a metric request from a client is received for data stored by the facility, the request is eventually received at a node within the cluster. For example, the request may be received through a REST_API 302 on a REST server (not shown), which is interfaced with the local filesystem 308. The facility retrieves the requested data, such as a metric value, from a particular disc 315 on a node, provided at the address (312) reference by the filesystem 308, and then returns the requested data to the client. In some embodiments, individual metric values for a single filesystem object may be returned. When a request is received for a directory having child directories, all metric values for the entire subtree defined by the directory are returned in response to a single request from a client in some embodiments. The client can parse the values in the response message in order to identify and display a specific metric value for a particular filesystem object to the user. In various embodiments, the response message is formatted in JavaScript Object Notation (JSON), extensible markup language (XML), or other data exchange language.

In some embodiments, the initial request call (e.g., GET, PUT, POST, DELETE) from a client may include a plurality of parameters for the value of the metrics in the response. For example, in one parameter the client is able to indicate a maximum number of "directory entries" to return for a filesystem object. The directory entries may include metric values for the directory and any descendant directories or files, such as those within a subtree defined by the directory. The returned values may include an aggregate values for the directory as well as any descendant directories. In another parameter, the client is able to provide an order to sort the returned directory entries for the directory. The order may be based on a retrieved metric value determined by aggregating an attribute of one or more files contained by the directory and any descendant directories. For example, the client may select to sort the returned directory entries based on the storage capacity used (e.g. the number of blocks in the facility) by that filesystem object and descendent objects. This parameter mainly pertains to sorting the directory entries corresponding to descendant directories of the requested directory since the requested directory includes the aggregate value of blocks used by each returned directory entry. Additional parameters may include.

Figure 4:
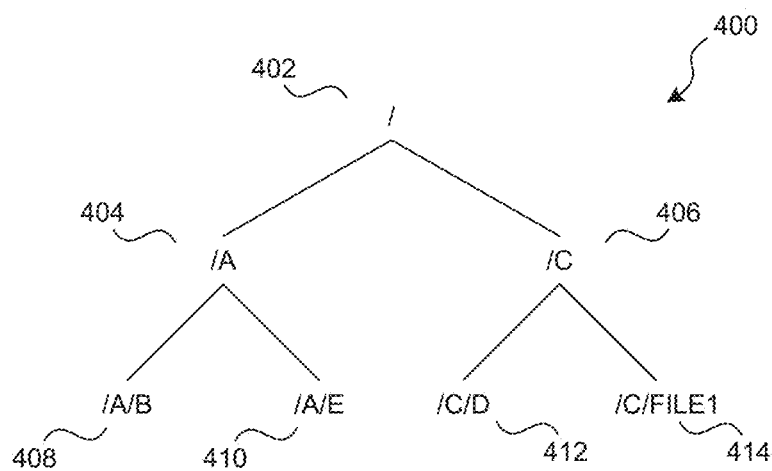
FIG. 4 shows a sample filesystem tree of filesystem objects.

FIG. 4 is a hierarchical tree-structure 400 representative of hierarchical data storage in the facility. The tree 400 includes filesystem objects 402, 404, 406, 408, 410, 412, and 414, including a root directory 402. As previously mentioned, a filesystem object can be a directory or a file. Each filesystem object 402, 404, 406, 408, 410, 412, and 414, in a tree typically stores and maintains a relatively current version of attributes and metadata for that filesystem object.

In particular, each filesystem object that is a directory 402, 404, 406, 408, 410, and 412 contains metadata and other data unique to the directory which characterizes files in that directory. The other unique data includes metric values of aggregated attributes for each file in, or "contained" by, the directory, along with information viable to access the contents of each of those files.

Each filesystem object that is a file 414 in the filesystem tree also contains metadata and one or more attributes characterizing that file, which may be aggregated and stored as a metric value in the directory under which that file is located in the filesystem tree. The metadata, aggregated values and other attributes may be stored in an inode portion of the filesystem object, which is later discussed with reference to FIG. 5. In some embodiments, the aggregated values for an individual file are stored in the directory entry pointing to that file. In some cases this is useful, for example, to accelerate operations that parse aggregate values for each entry in a directory.

Figure 5:
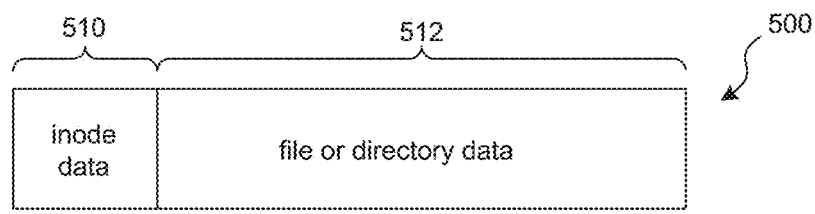
FIG. 5 shows a representative view of the contents of a filesystem object.

FIG. 5 illustrates an example linear view of the contents stored in a filesystem object 500. The filesystem object 500 can be stored in a data structure and can be of variable size. Each filesystem object 500 in the facility includes inode data 510 stored in one or more blocks at a particular filesystem location and file or directory data 512 stored at a corresponding filesystem location. Though the inode data is described as being stored both adjacent to and separate from the corresponding file or directory data 512, this inode data can be stored in association with any directory or file in any on-disc format and in any type of filesystem. In some embodiments, for filesystem objects that are directories, the directory data 512 contains a directory map data structure identifying each filesystem object contained by the directory by its name and inode number. For filesystem objects that are files, the file data 512 contains an extent list data structure identifying the disc blocks containing the file contents by the filesystem addresses usable to locate those blocks. In some embodiments, the facility also maintains a global data structure for mapping inode numbers from each inode in the filesystem tree to the filesystem location at which the corresponding inode data is stored. In some embodiments, the facility may store a copy of this global data structure on each node (e.g., in FIG. 2).

For filesystem objects which are directories, the inode data 510 includes both the attributes of the associated directory and current metric values of aggregated attributes for each filesystem object contained by that directory. For example, the inode portion of a directory corresponding to the directory's attributes includes data such as an owner, permissions, number of links to the directory, the size of the directory in bytes or blocks (my_cap_usage), file count in the associated directory (my_num_files), most recent access time (atime), minimum access time, number of times accessed, creation time, modification time, and change (edit) time. The inode portion of the directory corresponding to the aggregate metric values includes data such as, for example, total number of files in and contained by the directory (num_files), total block usage by the directory and files contained by that directory (capacity_usage), total number of directories contained by the directory (num_directories), and various other metrics within the scope of the art. In some embodiments, the inode data also includes metric values corresponding to the Input/Output (I/O) operations performed on the associated directory (or any filesystem object contained therein) and the resource consumption to perform those operations. In some embodiments, the operations include a number of accesses, number of disk actions for accesses, number of memory accesses for accesses, and number of blocks consumed.

For filesystem objects which are files, the inode data 510 may indicate file attributes such as a last access date (file_access), a name (file_name), a type (file_type), and a size (file_size). The file access time may include a date and/or timestamp indicating the last time the file was accessed by a client. The file type may indicate the format in which the file is stored. The file size may indicate the number of bytes, kilobytes or data blocks used to store the file.

The aggregate metrics stored in the inode data for each filesystem object reflect a current state of the files or file contained by that filesystem object, including the corresponding attributes of those files. The aggregate metrics stored in the inode data for each directory also include aggregated values for file attributes of each file contained by that directory. Accordingly, each time that a file contained by a directory or descendant directory of that directory changes, the aggregate metrics in the inode data of the directory are also timely updated to reflect those changes. For example, to reflect the current state of attributes for files contained in a directory of a filesystem tree, the metric values stored in the inode data may be updated (i.e., reconciled) each time that an change is made to a file in that filesystem tree. Accordingly, there are times when updates to one directory or file may not be immediately reflected in all of that directory or file's ancestors. If the updates have not been applied to a particular ancestor directory, the unreconciled data for that directory is reflected in a descendant filesystem object from where the change originated. If the updates have been applied to that directory, an unreconciled value and reconciled value in the descendant filesystem object from where the change originated can reflect it. For example, in some embodiments, if the unreconciled value and reconciled value are equal, this indicates that the metric values in the parent directory's inode data fully reflect the filesystem object's metrics. Maintaining knowledge of whether the attributes for a filesystem object are current or not can provide additional visibility into that filesystem tree. Accordingly, a reconciled value and an unreconciled value corresponding to each attribute in a directory may be stored in the inode data. In some embodiments, the metric values for any given directory are not returned to a client if a descendant directory indicates that there is unreconciled data requiring an update in that directory.

Each change or update to an individual file in a filesystem tree is reflected in the changes to the attributes stored in the inode data of that filesystem object and in any ancestor directories with which that filesystem object may be associated. This updating may be performed up the filesystem tree until the metric values corresponding the changed attribute stored in the root directory's inode data are updated. In some embodiments, the facility asynchronously updates each filesystem object with respect to a received change or alteration to a file stored in the filesystem tree. In some embodiments, the facility systematically traverses the filesystem tree to update each filesystem object. In some such embodiments, the facility continuously updates filesystem objects in a filesystem tree to reflect changes to any file or directory contained in that filesystem tree. As previously mentioned, in some embodiments, the filesystem objects in the filesystem tree are synchronously updated with respect to received changes or alterations to files stored in those filesystem trees. So, updates to filesystem objects in the facility may only be performed each time a change to a filesystem object is received for that respective tree. Various other methods for determining when to update filesystem objects and corresponding inode data stored in those filesystem objects are further discussed with reference to FIGS. 6-7D.

In some embodiments, the inode data 510 includes a value of a metric unreconciled to a parent directory, such as an unreconciled to parent block count and reconciled to parent block count which, when equal, indicate that all updates to the parent directory containing that filesystem object are current.

For example, if an attribute of a file (e.g., file_size) is updated in response to changes made to that file, then the updated file_size attribute will also need to be reflected in the metric corresponding to that file_size attribute in the parent directory and in any ancestor directory of that file. To indicate when the updated attribute is not yet reflected in the corresponding metric of the parent directory, a value of the metric unreconciled in the parent directory indicates a different value than the metric reconciled to parent directory. Each attribute of the file for which a metric value is stored in a parent directory can maintain these unreconciled to parent and reconciled to parent values. When these values differ, it indicates to the facility that the parent directory of that file needs to be updated by the difference between the values during a subsequent I/O operation.

In some embodiments, the facility maintains a separate "list" of filesystem objects having unreconciled data in a filesystem tree instead of, or in addition to, indicating the value of the unreconciled to parent data in the inode data of each filesystem object. In some embodiments, the facility maintains this separate list in volatile memory. Maintaining this list and performing a reconciliation process due to block count, or other attribute changes in a filesystem object, are further discussed with reference to FIGS. 7A-7E.

Referring back to FIG. 5, in some embodiments, the inode data and the second portion of the filesystem object data can be stored at specific location in a block storage unit used to store the filesystem object. For example, in some embodiments, the facility can store a pointer to that specified storage location to obtain the requested data. The filesystem object data includes data such as the payload or actual file data for that filesystem object. For example, in a directory, the data may include information pertaining to the files contained by that directory, such as the file paths and paths to any child directories. Accordingly, the directory data includes information for each file accessible via that directory and the location of the file. Each file contained by a directory may be included in various other directories in the facility as well. For example, as shown in FIG. 4, directory /A 404 defines a subtree made up of directories /A 404, /B 408, /E 410, each of which may contain various data files. The filesystem object for directory /A 404 therefore may store inode data having aggregated values for each of the files contained by /A, /B, and /E, and directory data including paths for each of those files. Any additional file-related or directory-related data within the scope of the present disclosure may also be stored in the second portion of the filesystem object.

Figure 6:
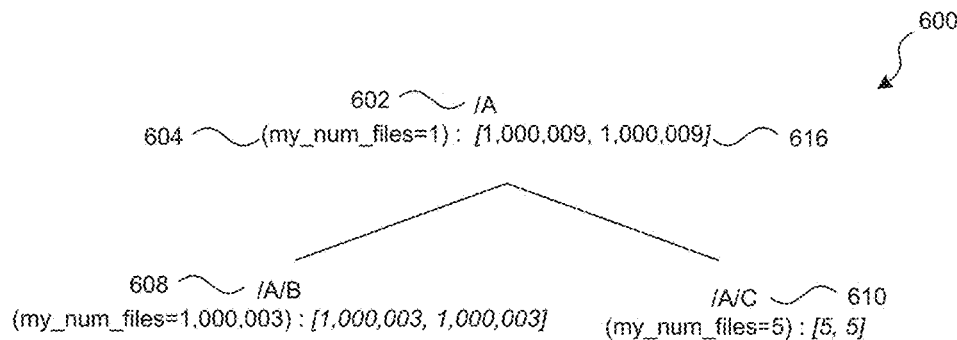
FIG. 6 shows a tree structure indicating a size attribute for a filesystem object and an aggregate size metric value for the filesystem object and descendent filesystem objects in a subtree of the filesystem object.

FIG. 6 illustrates an example subtree 600 of filesystem objects including at least one attribute and associated metric value for each filesystem object in that subtree. The subtree is defined by a directory /A 602. The subtree 600 may be located in a larger filesystem tree structure, such as the filesystem tree 400 shown in FIG. 4, which is defined by the root directory "/" 402. In the illustrated embodiments of FIG. 6, each filesystem object includes three values. The my_num_files 604 value of "1" in directory /A 602, is an attribute indicating a number of files contained by that particular directory (local file count). The second two values, represented in an ordered pair 616, indicate a reconciled and an unreconciled metric value [reconciled, unreconciled] for that attribute (num_files) in a parent directory (e.g., "/" in FIG. 4) of directory /A 602. In the ordered pair 616, the right value is a value of that metric that is unreconciled in the parent directory [1,000,009, 1,000,009] and the left value is a value of the metric that is reconciled in the parent directory [1,000,009, 1,000,009]. This ordered pair indicates whether the metric value in the parent of the filesystem object (e.g., directory /A 602) fully reflects any updates to that attribute (num_files) in any descendant filesystem object. In FIG. 6, since both metric values 616 in the ordered pair are equal, the corresponding metric in the parent directory (e.g., "1" in FIG. 4) fully reflects the updated metric value.

In FIG. 6, the num_file metric value is a hierarchical aggregate of the number of files (num_files) contained by each descendant directory (e.g., /B 608, /C 610) of that directory (/A 602) and any files directly contained by the directory itself (aggregate file count). For example, in the illustrated embodiment, a metric value (not shown) for the num_files attribute in directory /A 602 is "1,000,009". This metric value includes the aggregate values of my_num_files in each descendant directory (e.g., "1,000,003" for /B 608, "5" for /C 610), which include the aggregate values of any descendant files (e.g., FILE1, FILE2, etc.) in those descendant directories. The metric value in directory /A 602 also includes any local files, e.g., "1" 604, contained by the directory /A 602 itself for which that metric value is calculated. Accordingly, when a client requests a metric value for an attribute of a directory in a filesystem tree, which defines a subtree, that value reflects an aggregation of the attributes in any descendant directory plus the attributes of the directory on which the aggregation is performed.

For a large filesystem tree structure including many directories, performing an aggregation operation on all filesystem objects in that filesystem tree can consume considerable processing resources and elapsed time to determine a metric value for a given directory. However, as previously discussed, these additional metrics that include aggregate values of file attributes, are stored in the inode data for each directory. The inode data may be updated each time a filesystem object is updated. This inode data maintains a relatively accurate indication of the attributes for a given directory, even if recent changes to one or more files in that directory are not yet reflected. Accordingly, this allows for rapid and easy access to current filesystem attributes, which may facilitate performance and allocation of resources in both large and scalable filesystems FIGS. 7A-7E illustrate at least one method for updating attributes and associated metric values in filesystem objects of a filesystem tree. The method tracks each filesystem object to which a change is applied in a file path from the updated file to the root directory. To implement such tracking, each modified filesystem object may be added to a set of unreconciled filesystem objects, one or more of which is iteratively updated in the tree during a subsequent operation. For example, the set 722 may be a list of unreconciled filesystem objects maintained in a filesystem tree. Accordingly, the set 722 of filesystem objects may include both files and directories whose attributes have been changed, but not yet updated to reflect the change, and which may require an update in an ancestor filesystem object.

Figure 7A:
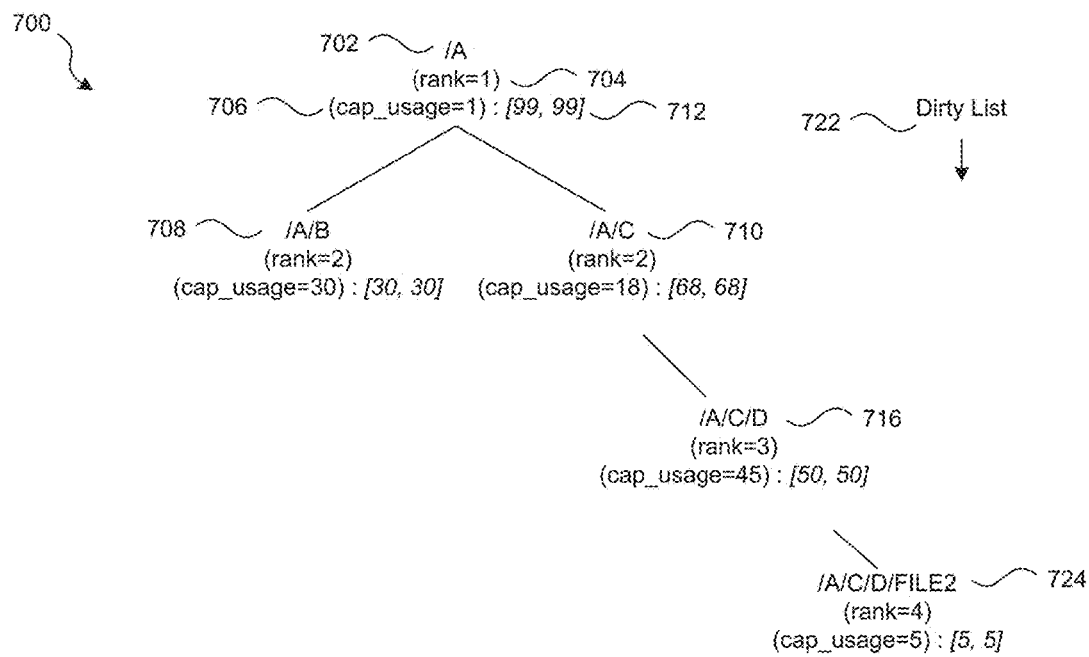
FIG. 7A shows a tree structure indicating rank attributes, capacity usage (cap_usage) attributes and corresponding reconciled and unreconciled to parent metric values for each directory in that tree.

FIG. 7A is example of a tree structure for data stored in a filesystem, such as for directory /A shown in FIG. 6. The filesystem tree 700 includes a directory /A 702 and various descendant directories /B 708, /C 710, and /D 716, and a file FILE2 724 of the directory /A 702. The directories and file also indicate two attributes that the facility maintains in the inode data stored in each filesystem object, which is either a directory or a file. For example, in directory /A 702, the two attributes include a rank 704 and a capacity usage (cap_usage) 706. The rank indicates a level of the filesystem tree in which the filesystem object is located. For example, the directory /A 704 indicates "rank=1" since it is at the top of the tree hierarchy (and, a first descendant of the root directory "I" in FIG. 6). The filesystem object's capacity usage 706 identifies a number of blocks used by a particular filesystem object as discussed with reference to FIG. 3. In FIG. 7A, directory /A 702 has a cap_usage of "1", though the aggregate cap_usage of the sub-tree defined by directory /A 702 has a cap_usage of "99" (i.e., 5 (FILE2)+45 (/D)+18 (IC)+30 (/B)+1(/A)=99). Though the rank and cap_usage are attributes used in the updating process of the following description, it is understood that various additional attributes are considered and either or both the rank and cap_usage are not required attributes within the facility.

The filesystem tree in each of FIGS. 7A-7E also indicate an ordered pair [reconciled, unreconciled] 712 providing the value of the cap_usage metric for the reconciled to parent block count and the unreconciled to parent block count in each filesystem object in that tree 700. These values 712 indicate whether changes to the block count value in each filesystem object have been updated (e.g., are current) in the parent directory of that respective filesystem object. Accordingly, in some embodiments, if all updates have been reconciled to a parent directory of a given filesystem object, the reconciled cap_usage and unreconciled cap_usage ordered pair 712 are equal. FIG. 7A illustrates such an embodiment since the aggregate block count in the ordered pair 712 is equal [99, 99].

Figure 7B:
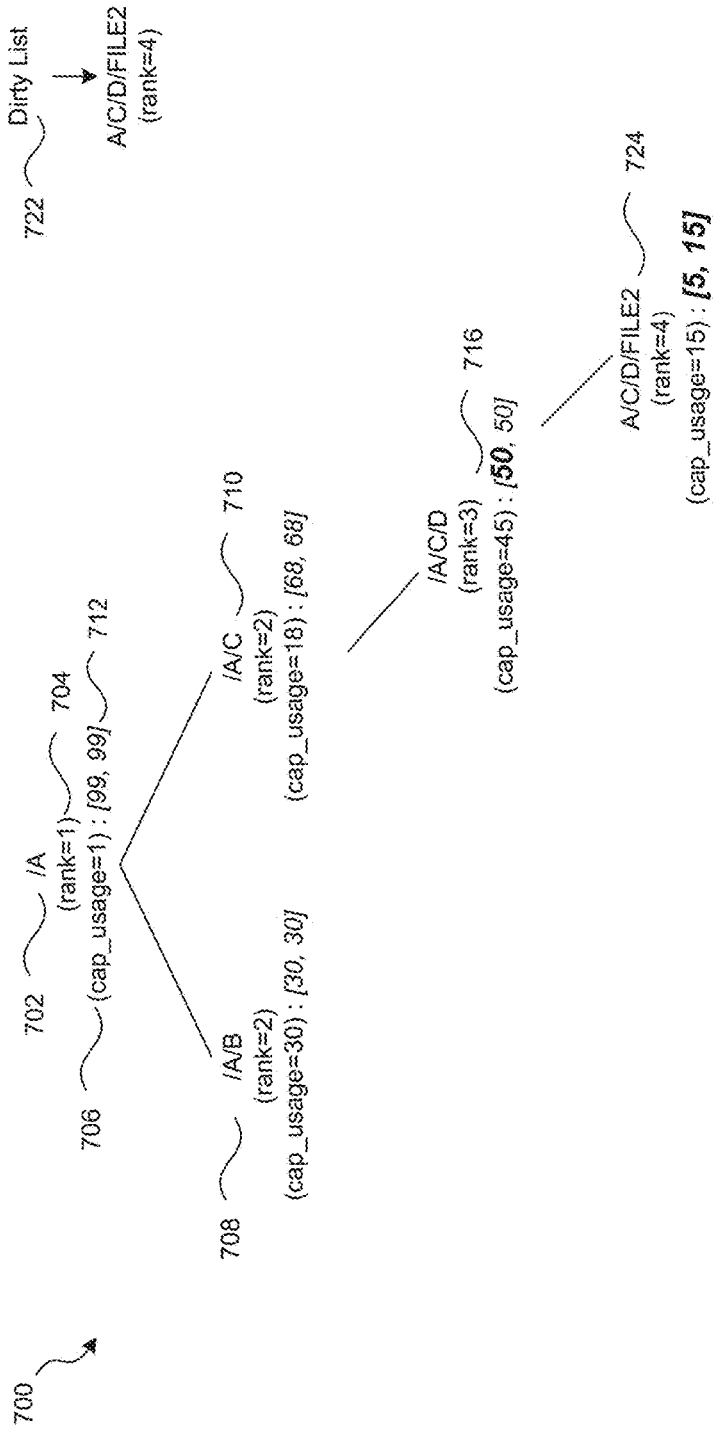
FIGS. 7B-7E shows the tree structure of FIG. 7A and a dirty list for updating the reconciled and unreconciled to parent metric values in each directory of the tree.

FIG. 7B illustrates the filesystem tree 700 after changes are made to FILE2 724 in directory /D 716. When the changes are made to a file, in some embodiments, the changes are immediately reflected in the attribute values stored among the inode data for that filesystem object. Accordingly, FILE2 724 reflects an updated cap_usage of "15". However, FILE2 724 is still considered "unreconciled" since the changes to that file still need to be reflected in the directory data and the attributes stored in the inode data of the directory /D 716 which contains FILE2 724. As a result, FILE2 724 is then added to a separate file for a set 722 of "dirty" filesystem objects. The set 722 tracks the filesystem objects requiring an update to reflect changed attributes of a changed file (e.g., FILE2) in that directory (e.g., /D). A "dirty" filesystem object is also indicated in reconciled and unreconciled values (e.g., FILE2 724) that provide differing numbers (e.g., [5, 15]) for reconciled and unreconciled block counts in its parent directory /D 716.

Figure 7C:
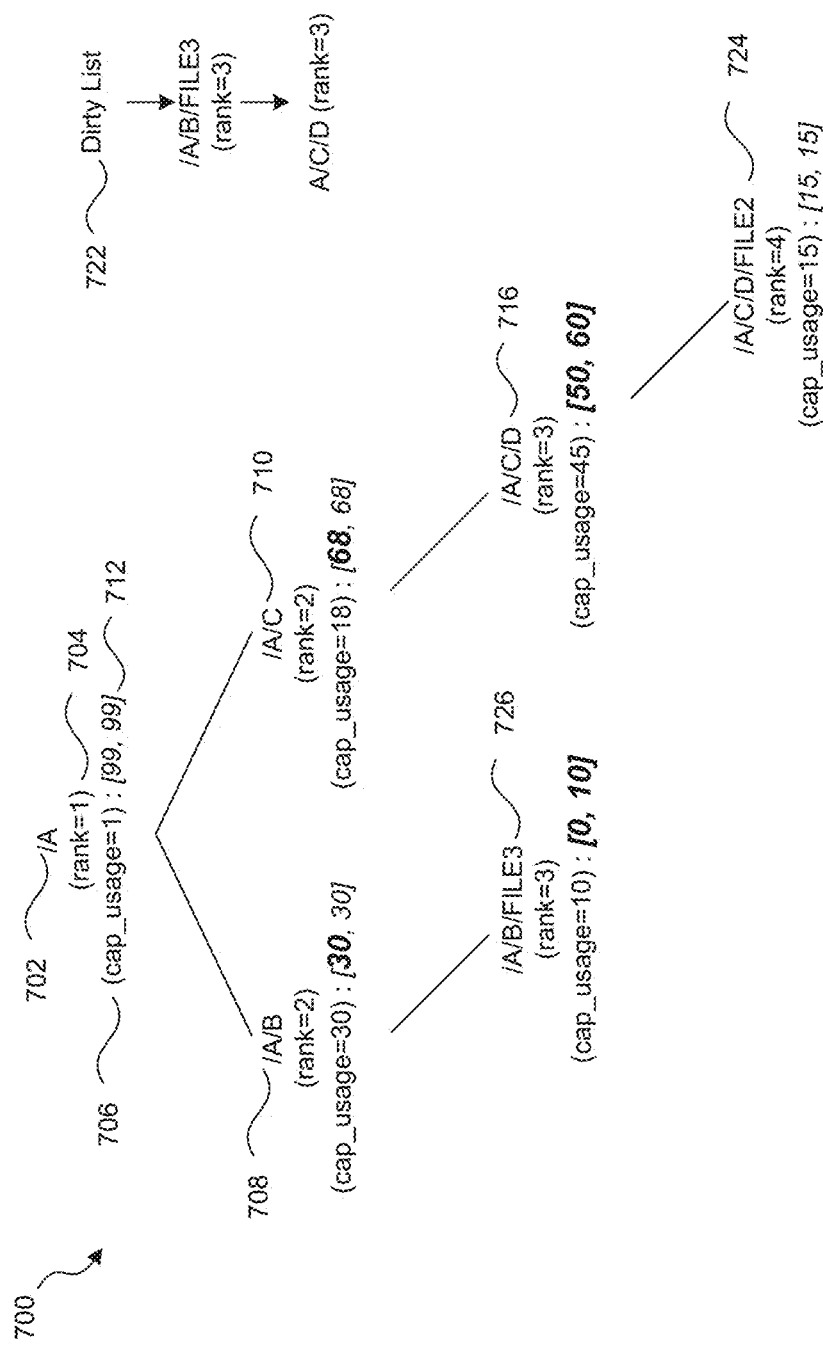

Once the corresponding metrics in the inode data for FILE2 724 have been updated in directory /D 716, the next associated ancestor filesystem object in the file path from FILE2 724 to the root directory (not shown), is added to the set 722 of dirty filesystem objects being tracked for updating. So, after reconciliation is performed in FIG. 7B, the next filesystem object added to the set 722 is directory /D 712 (shown in FIG. 7C). This is because the new value of the cap_usage attribute may alter at least one metric value of the aggregated attributes stored in the inode data of the parent directory /C 710, which contains directory /D 716 (and FILE2 722). Additionally, the reconciled and unreconciled block counts in FILE2 724 are then updated [15, 15] to reflect the reconciled updates to the aggregate metrics in directory /D 716. The reconciled and unreconciled counts in directory /D 716 are also updated to reflect the unreconciled blocks [50, 60] in its parent directory (/C 710) as illustrated in FIG. 7C.

In various embodiments, the facility stores the set 722 of dirty filesystem objects either as persistent data (on-disk) or volatile data (in-memory), each of which has its advantages and disadvantages. For example, where the set 722 stored in persistent storage, no initial inode scan is necessary at startup, but updates to each filesystem object are slower than when the set 722 is maintained in volatile storage. Where the set 722 is stored in volatile storage, normal operations are performed faster, but an initial inode scan is required at startup.

In some embodiments, if more than one filesystem object is located in the set 722, the filesystem object having the lowest rank (e.g., farthest file path length from the root directory) in the filesystem tree may be updated first such that its attributes indicate the updated cap_usage value. This ensures that all updates to filesystem objects in the filesystem tree are not repeated, which improves the efficiency of the facility. The filesystem objects within the set 722 of filesystem objects to be updated may be reconciled in an iterative process. Additionally, the filesystem objects in the set 722 may be sorted in order to remove duplicates and to update entries having the lowest rank first. This is done in order to avoid unnecessary and repeated updates to a filesystem object whose descendent also is included in the set 722.

As discussed previously, any updates to a filesystem object may be reflected in hierarchical aggregates indicated by the metric values stored in the inode data for each filesystem object. Once a filesystem object is updated, the filesystem object's entry in the set 722 is removed and the filesystem object's parent directory is added to the set 722. Additionally, the reconciled and unreconciled values for that attribute are updated to reflect the unreconciled data in that filesystem object's parent directory. The metric values indicated in each filesystem object may be updated in a direct path of the directories from the updated file to the root directory. Thus, only the filesystem objects in the path of the file to the root directory need be updated. Unaffected filesystem objects and subtrees are therefore not traversed or updated. So, system resource consumption may be reduced, relative to the time required for iterative scans of the full filesystem tree, and metric values of filesystem object attributes may be updated more quickly since system resources are not allocated to perform unnecessary tasks.

In some embodiments, where the facility receives a request for metric values in a "dirty" filesystem object (i.e., in set 722, or a descendant thereof in set 722), the facility updates only the filesystem object (and any descendants) in the set 722 prior to servicing the request. In some embodiments, the facility updates all filesystem objects in the set 722 prior to servicing a request by a user. In such embodiments, the facility can ensure the most up-to-date metrics for the request. To alternatively determine whether a filesystem object (or descendant thereof) is not completely current, the facility can also check the reconciled and unreconciled count for each descendant of that filesystem object. If any counts differ, the facility can then either update each of the descendants to the requested filesystem object prior to servicing the request, or update the entire tree to the root directory, as previously mentioned, FIG. 7C illustrates the filesystem tree structure 700 in which the change to FILE2 716 is subsequently updated in the inode data associated with directory /C 710. This is indicated by the differing reconciled and unreconciled values [50, 60] of the ordered pair in directory /D 716, which signify that only fifty blocks are currently reconciled in directory /C and sixty blocks need to be reconciled to make the metric values stored in directory /C current. The reconciled value "68" in the ordered pair of its parent directory /C illustrates where the update is to be applied. Accordingly, the set 722 of filesystem objects reflects an entry of directory /D 710. The set 722 of filesystem objects also includes a newly added filesystem object, FILE3 726, for which the cap_usage of "10" needs to be updated in the cap_usage metric of its parent directory /B 708. Accordingly, FILE3 indicates reconciled and unreconciled ordered pair values of [0, 10] since 10 blocks need to be added to the reconciled block count (i.e., "30") in directory /B 708 to make that directory's aggregate attributes current.

As shown in FIG. 7C, directory /D 716 and FILE3 726 may concurrently be processed during the next iteration since both have a rank of "3". In some embodiments, each iteration, or processing of filesystem objects in the set 722 of filesystem objects, removes filesystem objects on corresponding levels (e.g., "rank" in FIG. 7C) of the filesystem tree structure. In other embodiments, each filesystem object in the set 722 may be processed and updated sequentially, based on the order in which that filesystem object is placed in the set 722. In the aforementioned embodiment, one or more entries in the set is processed during each iteration.

Figure 7D:
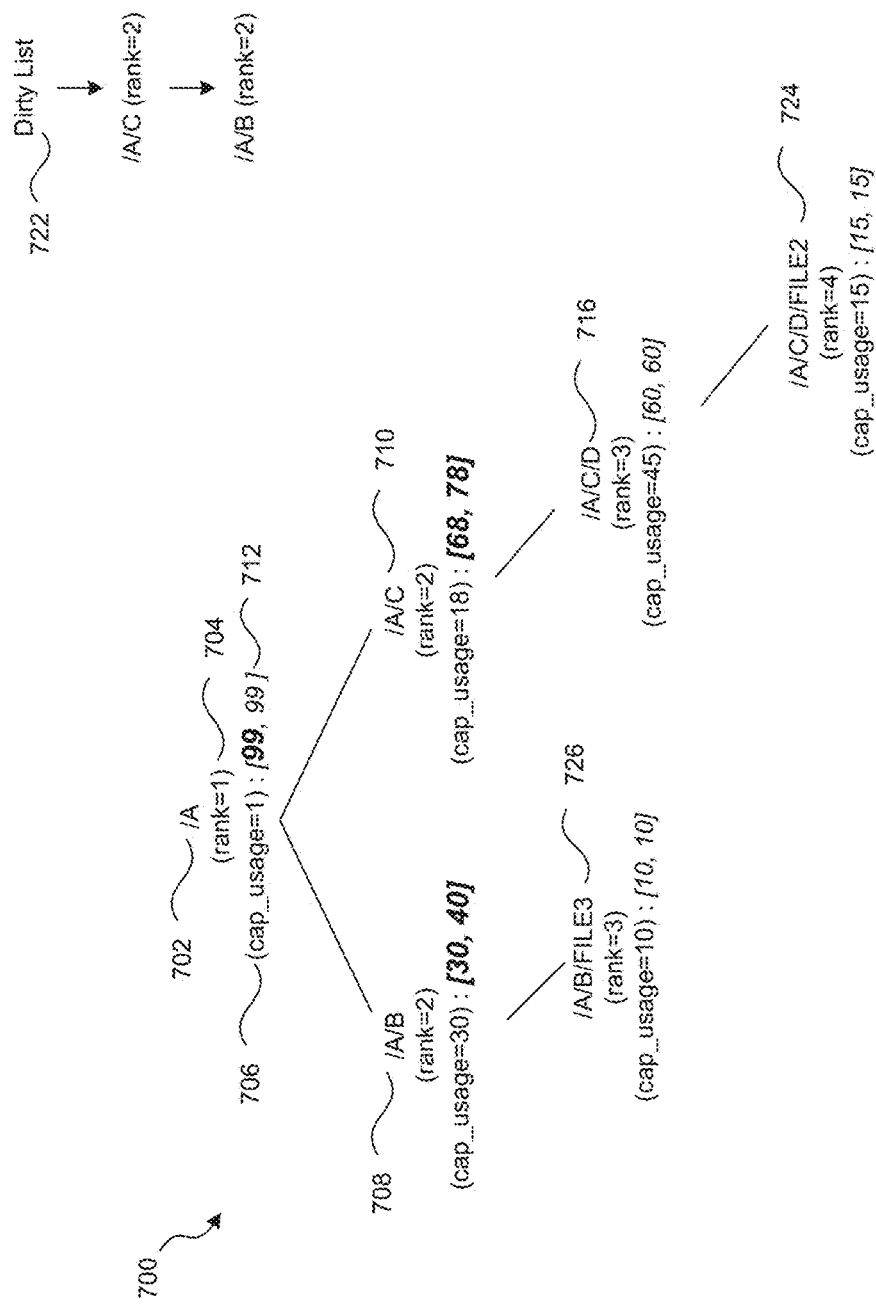

FIG. 7D illustrates a tree structure 700 in which directory /D 716 and FILE3 726 reflect the updates processed during the iteration performed in FIG. 7C. Accordingly, the cap_usage aggregate attribute in the inode data for directory /B 708 now reflects an updated unreconciled to parent metric value of "40" in the ordered pair values [30, 40] in that directory. Similarly, directory /C 710 now reflects an unreconciled value of "78" in the ordered pair [68, 78]. These unreconciled values both reflect unreconciled cap_usage metrics in the common parent directory /A 702 as well as indicate those directories as being "dirty". So, these parent directories (IC and /B) in the direct path of the processed filesystem objects (/D and FILE3) are added to the set 722 of filesystem objects to be updated. The set 722 then includes directories /B 708 and /C 710, which are concurrently processed during the next iteration because both are rank "2" in the filesystem tree 700. The reconciled and unreconciled values in FILE3 726 and directory /D 716 are also updated to indicate updates applied to their respective parent directories and those filesystem objects are then removed from the set 722 of filesystem objects.

Figure 7E:
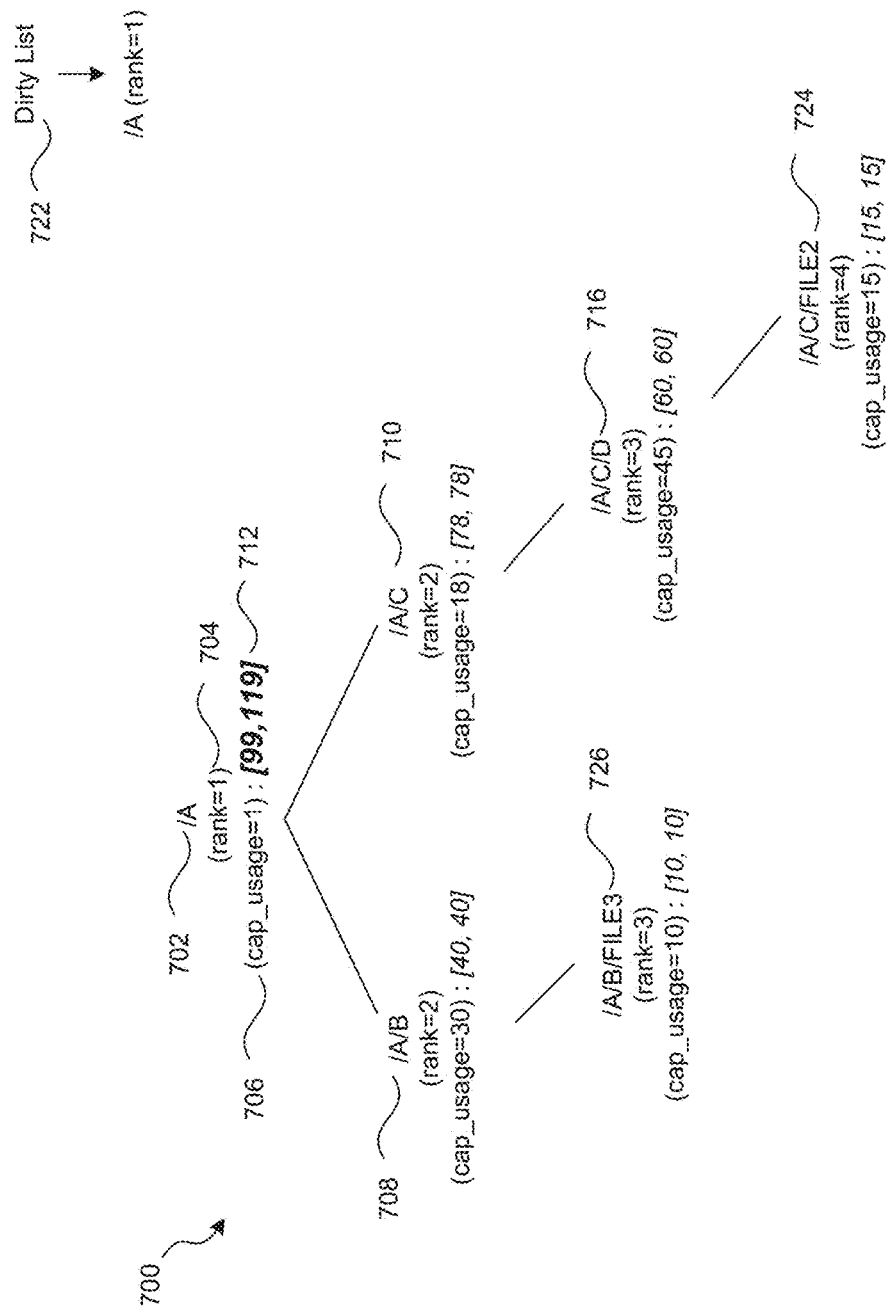

Once directories /B 708 and /C 710 are processed, as illustrated in FIG. 7E, directory /A is then added to the set 722 of dirty filesystem objects. Since that directory is the parent directory for both /B 708 and /C 710, the duplicate entry is removed in order to prevent unnecessary processing of directory /A on the next iteration. The reconciled to parent and unreconciled parent values 712 for directory /A 702 are also updated to reflect an unreconciled cap-usage value (99, 119) in its parent directory (not shown). The reconciled and unreconciled values in directories /B 708 [40, 40] and /C 710 [78, 78] can also be updated to indicate an updated aggregate metric value in the parent directory (/A). Once directory /A 702 has been processed in a similar manner during the next iteration, directory /A 702 will be removed from the set 722 and the value for that filesystem object attribute will also be updated to "119". Accordingly, the ordered pair will be [119, 119].

An alternative approach to update the aggregate metric value in, for example, directory /A 702 (in FIG. 7D), is to take the difference between the reconciled and unreconciled values for cap_usage in both directories /B 708 and /C710, sum (e.g., sum ( )) those differences, and add that sum to the cap_usage metric value stored in directory /A 702. For example, in directory /B 708 the difference [30, 40] is "10" and in directory /C 710 the difference [68, 78] is "10". So, "20" is the sum of those differences, which is then added to a prior stored, or reconciled value ("99") for cap_usage in directory /A 702. If during this update a change occurred to a lower ranking filesystem object in the filesystem tree (e.g., /D 716), prior to processing the update on directory /A 702, then directory /A 702 would remain in the set of filesystem objects 722 until directory /D 716 is processed. Each lower ranking filesystem object (e.g., from /D up) will then be processed in a similar manner described above, prior to directory /A 702. This prevents additional processing on directory /A 702, such that all updates on that directory may be processed in the same iteration and reflect the most current update to cap_usage (or other attribute) in the inode data of that directory.

Accordingly, in some embodiments, the facility updates a directory's aggregated metric value for a specific attribute by summing a difference between the reconciled and unreconciled values in a child directory with the metric value previously stored in that directory. In another example, referring back to FIG. 7B, each directory and file maintains a count of [reconciled, unreconciled] data to facilitate aggregation of filesystem object attributes. The difference between the unreconciled data in directory /D is equal to "10" (reconciled=50, unreconciled=60). So, to determine the metric value for that attribute of cap_usage in directory /A/C, the filesystem simply sums "68" plus the difference "10" to perform the aggregation. This value can be verified, or alternatively determined, by recalculating values of all entries in directory /C to generate a new aggregate value.

Though the aforementioned embodiments maintain a separate list (e.g., the set of filesystem objects 722) to update metrics in the facility, the metrics can be updated by other methods which do not include such a list or associated filesystem object ranks. For example, in some embodiments, the facility ensures the currency of all of the metrics in the entire filesystem tree each time a filesystem object is updated. In effect, each time a filesystem object is updated, the system traverses the filesystem tree in which that filesystem object is stored to the root directory and updates the metrics in each directory of the direct path from the filesystem object location in the filesystem tree until the root directory is updated to also reflect the update. In some embodiments, an asynchronous, or background process continually traverses trees accumulating and updating metric values for file attributes in the filesystem objects.

To handle filesystem object updates such as deletion of a file or directory from a filesystem tree, the reconciled and unreconciled data for each ancestor directory can be updated in a similar manner as previously described with reference to FIGS. 7A-7E. However, instead of adding the difference between the reconciled and unreconciled values in the filesystem object, the value of the deleted filesystem object is considered a negative unreconciled value in the parent directory associated with that filesystem object. Accordingly, the difference between the reconciled value in the deleted filesystem object and the unreconciled value in the parent is subtracted from the parent's reconciled value during a subsequent operation. Based on this adjustment, each directory in a path from the parent of the deleted filesystem object to the root is ultimately updated normally, such as through the process described in FIGS. 7A-7E (i.e., placing each filesystem object on a separate list 722). Furthermore, any unreconciled value in the deleted filesystem object is ignored since that filesystem object is being removed from the filesystem tree. To handle updates such as renaming a filesystem object, e.g., moving the filesystem object to another directory, the facility performs the aforementioned deletion process under the current name, and creates a new filesystem object under the new name, such as described in FIG. 7C with reference to FILE3. If the filesystem object had any unreconciled data, e.g. differing values in the ordered pair, the unreconciled value remains consistent throughout the deletion and creation process. The updating process for the unreconciled data then occurs normally (e.g., via the process in FIGS. 7A-7E) during a subsequent iteration on the renamed filesystem object.

For filesystem object attributes not having integer values, metric values can be updated by aggregation functions (e.g., latest( )) which compare a prior value of that respective value in each filesystem object being updated. For example, the attribute can include an raccess attribute identifying a most recent access date/time ("atime") of the filesystem object. The facility can compare the previous raccess date in a directory with an updated raccess date received from a descendant filesystem object, as opposed to looking at the raccess dates of all of the descendants in a subtree defined by that directory. For certain metrics and/or aggregation functions, a new aggregation can be performed across all filesystem objects in a tree or subtree in order to update metric values.

In some embodiments, the facility retrieves information about characteristics of a node, a cluster, or the entire filesystem from statistical sampling of a filesystem tree. The facility chooses the fraction of samples taken from files in each directory of the filesystem tree in such a way as to achieve a sample population that is appropriately distributed across the filesystem tree. In some embodiments, the facility determines the overall number of samples taken to satisfy a desired confidence level in the results.

Figure 8:
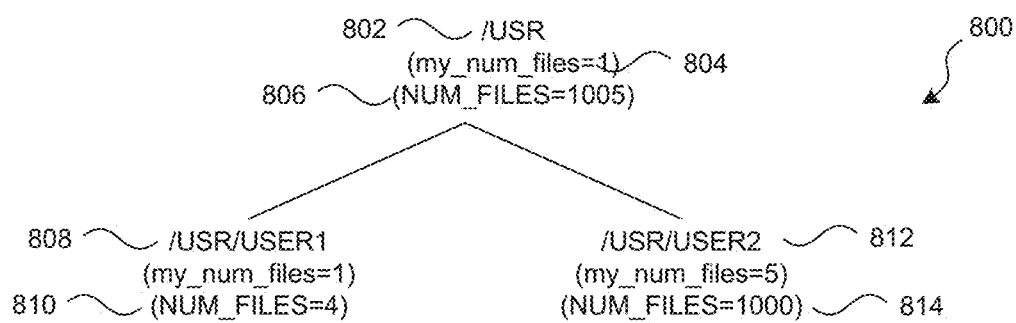
FIG. 8 shows a tree structure indicating weighted metadata for sampling.

FIG. 8 illustrates an unbalanced filesystem subtree 800 defined by a directory /USR 802, which has two child directories, directory /USER1 808 and directory /USER2

812. The shown subtree includes two file types, music 818 and other (non-music) data 822, specific to each of the child directories. In an example, the facility performs sampling using block count attribute (i.e., cap_usage) to answer the question, "what percentage of files stored in the subtree are music files?" Where the directory /USER1 808 includes only four data files 810, while the directory /USER2 812 includes one thousand music files 814. A simplistic even sampling performed on the root directory /USR 802 would result in a sample from each of the descendant directories 50% of the time. Accordingly, the sampling would result in a 50/50 split of music and data files in the root directory /USR 802. Since the file count attribute for each directory, /USER 1 808 and /USER 2 812, indicates that the root directory /USR 802 is not made up of 50% music files and 50% data files, these sampling results are clearly skewed and inaccurate. Thus, this approach to sampling may result in the erroneous conclusion regarding the makeup of a particular directory.

To avoid the aforementioned errors, the facility uses a fair sampling approach in which it uses the metric values stored in the inode data of the directories to weight these directories in a manner that determines the likelihood that each file sample gets taken from each directory. By weighting the directories in this way, the facility achieves an improved representative sampling of the composition of the data in the filesystem tree structure. Additionally, since any attribute of a filesystem object can be utilized to weight the directories, the representative sampling is improved for each individual filesystem attribute.

To perform fair sampling on the filesystem subtree 800, the facility uses, for example, a NUM_FILES attribute associated with each directory to establish sampling frequency weights for each directory of the filesystem tree. The NUM_FILES value is the total number of files associated with a directory summed with the files in all descendant directories. Using this NUM_FILES attribute therefore answers the question, "what percentage of files are music files?" So, the total number of files to be sampled between the two directories /USER1 808 and /USER2 812 for the root directory /USR 802 is 1004 since the NUM_FILES attribute 806 for the root directory indicates "1005" and the my_num_files attribute for the root directory indicates "1". By storing the aggregate file count in the inode data (e.g., 816, 820) of each directory, the system can quickly query those directories and determine that the files under directory /USER1 808 should be sampled "4" times out of every "1004" samples, or approximately 0.4% of the time, and the files under directory /USER2 812 should be sampled "1000" times out of every "1004" samples, or 99.6% of the time. If one hundred samples are taken in this manner, the sample results would indicate ~99% of the files are music files in the root directory /USR 802. This result is more accurate than the 50% music files calculated without using the metric values corresponding the aggregated attributes of the files contained by the root directory /USR 802. This type of weighted sampling may be applied to any attribute of files within a filesystem tree in the facility and may facilitate improved visibility into the files contained by that tree. For example, weighted sampling may be used to determine a file size for two directories including unbalanced average file sizes, e.g., one includes .mp4 files and the other includes .doc files.

FIG. 9 is an example screenshot of graphical user interface displayed on a client device, such a computing device. The user may elect to view various analytics 902 regarding the filesystem, such as a particular filesystem tree structure. For example, the user may select a particular directory, e.g., root directory "/", for which to view those analytics. In response, the facility returns the one or more metric values along with a graphical representation of those metric values corresponding to a pathname 904 indicating the selected directory. The metric values include storage data for the indicated root directory "/", such as an overall size (277.5 gigabytes) 906 of the directory 904, including a percentage (99.7%) of available storage capacity used by that directory, and a percentage (5.69%) of overall storage capacity used by that directory in the facility. The metric values includes a recent access (raccess) date 910 on which any file in the directory was last modified and a creation date 908 on which the directory was created. Additionally, the metric values indicate an aggregate number (8288) of directories 912 in the directory 904 and an aggregate number (56877) of files 914 in that directory.

In some embodiments, the graphical user interface indicates metric values for operations performed in a directory. For example, a listing of the top I/Os per second ("IOPS") activity 916 within the selected directory 904 is displayed. Each of these directory entries includes the path of the file at which the I/O is performed along with the number of I/O operations performed per second with respect to that file. A user can select parameters for returning the IOPS activity as well. For example, in some embodiments, the user can elect to view any IOPS namespace activity 920 related to reads and/or writes to namespaces or directories in the selected directory. In other embodiments, the user may elect to view IOPS file activity 922 related to files contained in the directories of the root directory.

The graphical representation of the metric values can include the directories of first-level (e.g., rank 1) that are children of the root directory "/", represented by the columns 918 of the graphic. The height (y-axis) 924, 926, 928, and 930, of each directory rectangle reflects the aggregate number of files or storage capacity used by that directory in relation to its parent directory. Accordingly, some of the smaller-size directories may not be visible in the graphical representation of the root directory shown in FIG. 9.

Figure 10A:
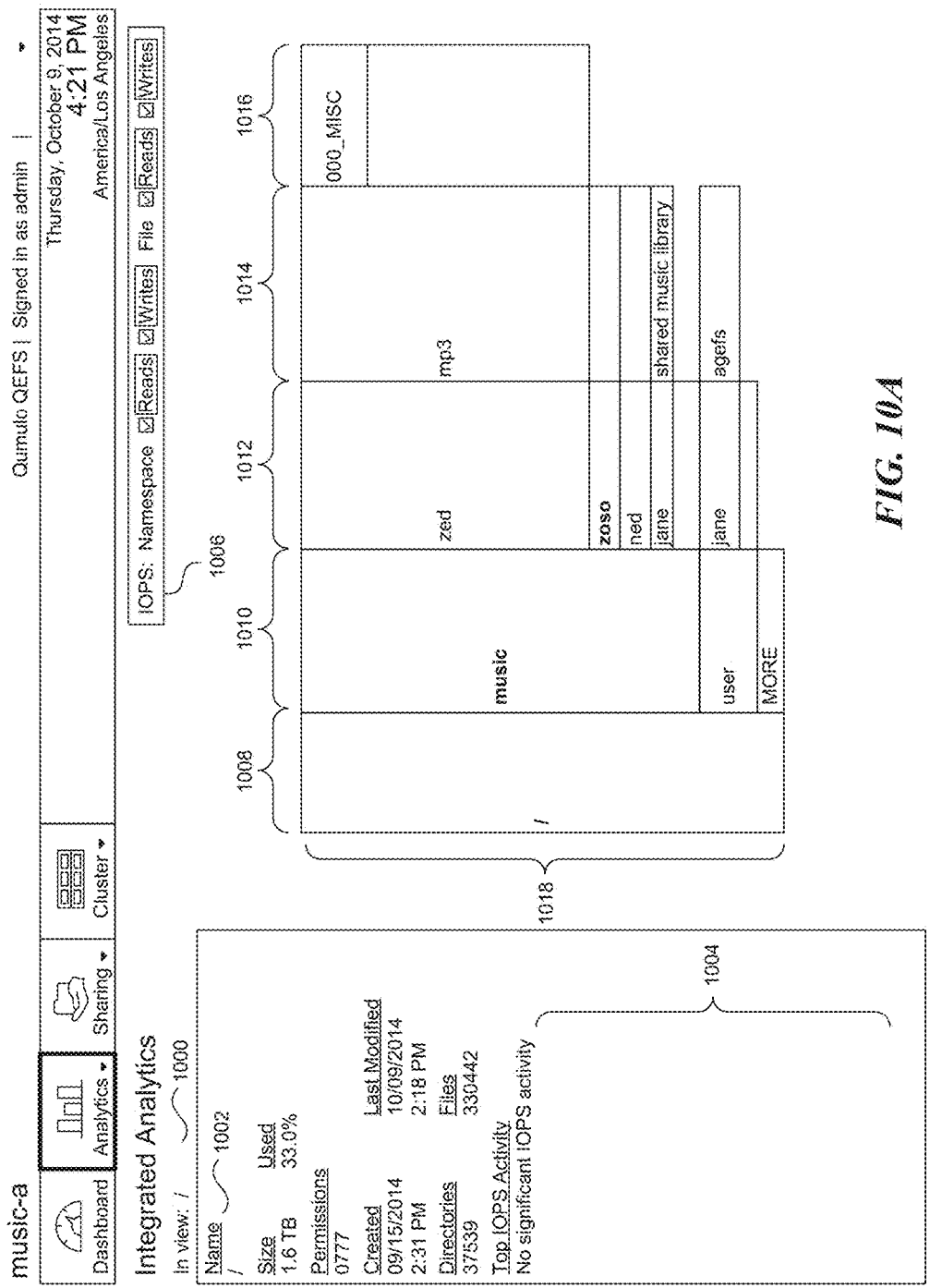
FIGS. 10A-10C are display diagrams showing different directory levels selectable through an interactive GUI provided by the facility that indicate metric values for directories of a filesystem hierarchy.
Figure 10B:
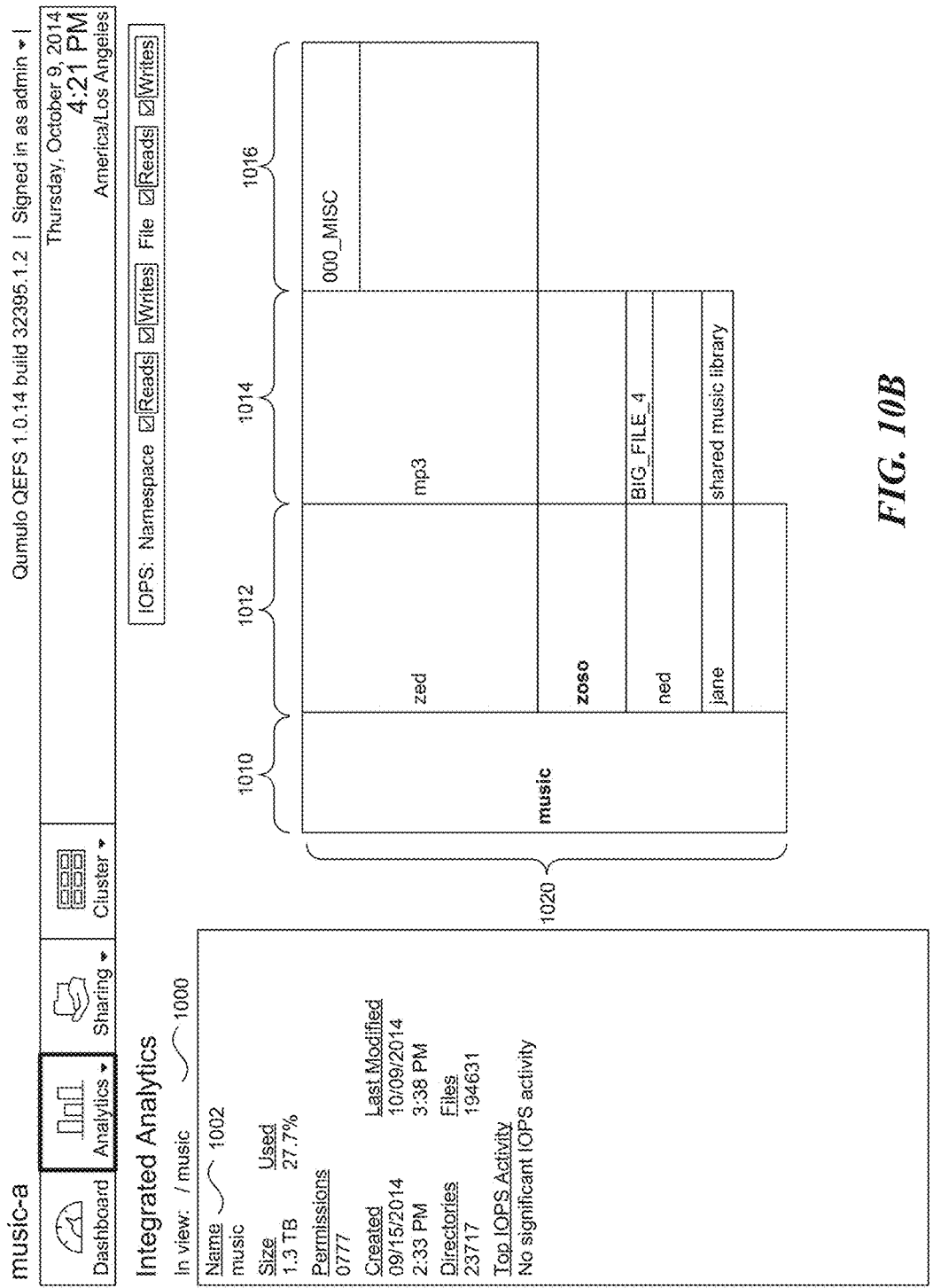
Figure 10C:
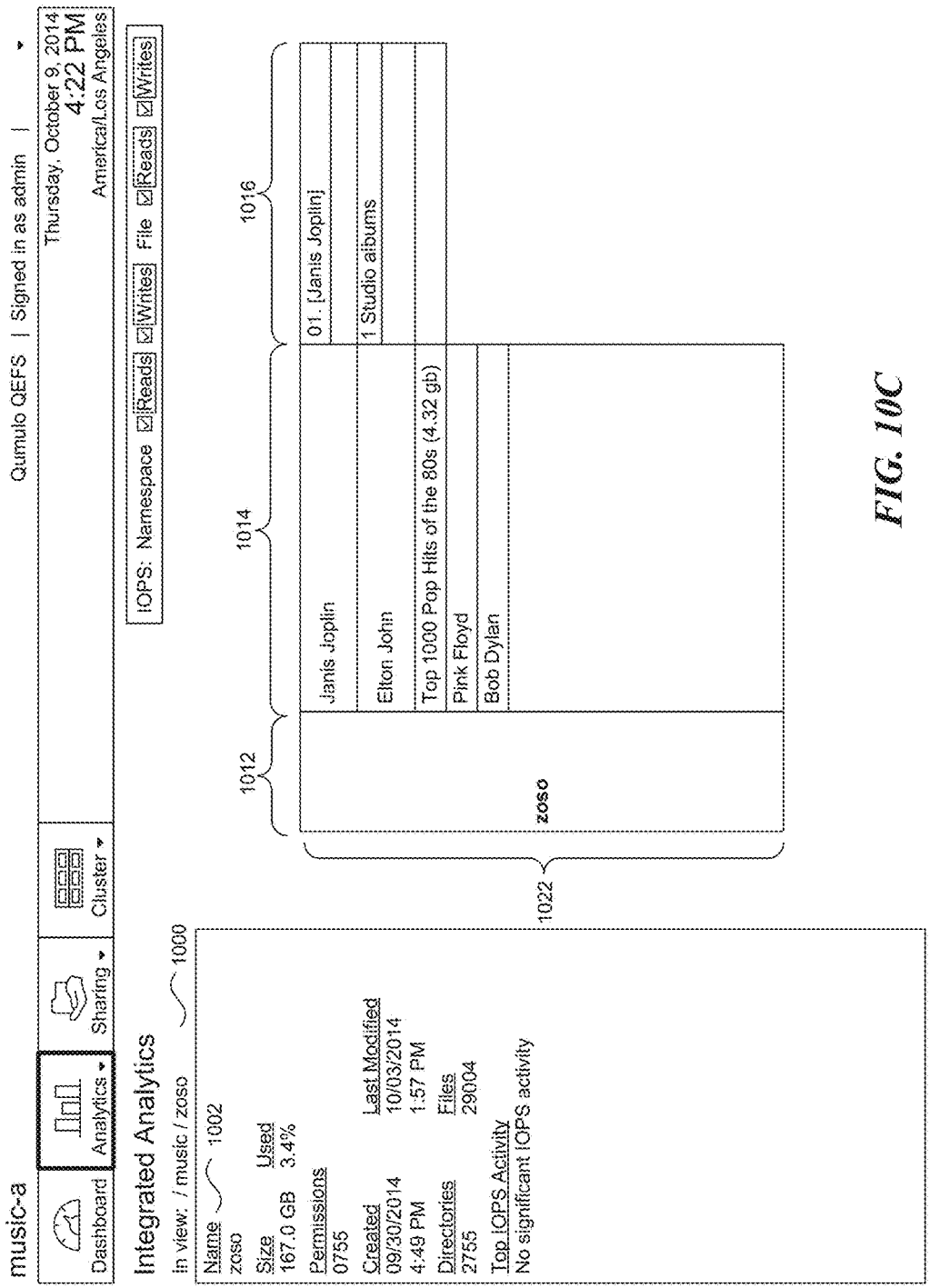

FIGS. 10A-10C are example screenshots of a graphical user interface displaying on a client device metrics for various directories in a filesystem tree. In FIG. 10A, a root directory is shown to be selected at the corresponding path 1000 in the filesystem, which is further indicated by the pathname "/" 1002 proximate to a plurality of analytics relating to that directory. Within the selected directory, there has been no recent activity. Accordingly, though each operation performed on the directory 1006 is selected for display, the IOPS activity 1004 in the cumulative analytics is empty. The size of the selected directory is graphically represented by the height of the column indicating that directory. In particular, column 1008 indicates directory "/" and its height 1018 corresponds to the size of the root directory (1.6 TB). The size of each of the three directories within the root directory (/music, /user, /MORE) is further indicated by the height of each of those child directories in relation to the root directory. So, based on the visual representation, the /music directory in column 1010 is clearly the largest, with the /user directory consuming more than the /MORE directory. To determine the exact size of a directory visible within the graphical representation, such as the "music" directory, the user simply selects that directory in the graphical representation.

FIG. 10B shows an example screenshot of the graphical user interface displaying analytics for the "music" directory after selection of that directory in FIG. 10A. As shown, the directory path 1000 now indicates the path "/music" for the /music directory. Additionally, the pathname 1002 and corresponding analytics are also updated to reflect analytics specific to that selected directory. In the graphical representation, the /music directory column 1010 is the leftmost column and each of the directories in the music directory are further expanded and detailed in the graphical representation. The height 1020 of the /music directory column 1010 now corresponds to 1.3 TB as indicated in the analytics for that directory. To determine the metrics of any child (or descendent) directory contained by the /music directory, the user can then select a displayed directory in the graphical representation. For example, the user can select the /music/zoso directory in column 1012, which shows the child directories for the /music directory.

FIG. 10C shows an example screenshot of the graphical user interface displaying analytics for the /music/zoso directory after selection of that directory in FIG. 10B. After selection of the /music/zoso directory, the path 1000 is updated to show the path for that directory "/music/zoso" and the path name 1002 is updated as well. The graphical representation is also updated to reflect the /music/zoso directory at the leftmost column 1012 and the correspond directories (or files) contained by the /music/zoso directory. As with the preceding FIGS. 10A-10B, the height 1022 of the /music/zoso directory corresponds to the size (167.0 GB) of the directory. Furthermore, the height of each directory in each child or descendant directory in relation to the parent directory corresponds to the size of that directory, By providing enhanced visibility into the attributes of a data storage filesystem aggregated and stored at different levels in the filesystem hierarchy may facilitate management of the filesystem. It may be desirable to acquire analytics on portions or the entirety of a data storage filesystem tree. Analytics may relate to system capacity such as space usage by subdirectories, file counts, what is the newest/oldest file in a directory/tree, what file is most/least accessed, a histogram of file sizes, a breakdown of characteristics by file type such as space usage, file count, and the like. Other analytics may relate to performance such as transfer rates, I/O operations such as total operations, timing of I/O operations, latency and the like. This information may be used by system administrators for purposes such as: allocation of most frequently accessed data to data storage devices having a fast response time; customized backups based on date of most recent modification or change; resource planning based on total block usage by filesystem; and the like.

Live metrics of aggregate file attributes are therefore stored by the facility in the inode of a directory in the filesystem tree structure. The metric values are live in the sense that they are updated with respect to received updates for any filesystem object within the tree structure. Though each metric value may not reflect the most recent update to a particular directory, those metric values are current, or relatively current. Accordingly, the requested metric values are returned with a very low degree of latency unlike external systems. In some embodiments, the metrics are gathered from a recent system snapshot, where snapshot frequency and resulting latency may be set by a system administrator.

In some embodiments, in addition to storing metrics in the inodes of directories that are aggregated from the filesystem objects of the subtree defined by each directory, the facility also stores metrics in the inodes of files that relate solely to each file. The file metrics are copies of the file's attributes. In some embodiments, files can be added to the set of filesystem objects to be updated, as discussed in FIGS. 7A-7D.

In various embodiments, this information may facilitate the understanding of additional filesystem characteristics that may not be embedded in metadata such as: what percent of space within the filesystem is consumed by particular types of file (e.g., music files), how many files are owned or controlled by, or were created by, a particular user, information relative to additional user specified attributes (e.g., client or patient names) which may be embedded into file name structure, tags in file header data and the like.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for managing metrics for a filesystem over a network, wherein one or more processors execute instructions to perform actions, comprising:

receiving one or more changes affecting one or more files contained by a directory in a hierarchical tree of filesystem objects, wherein each filesystem object includes one directory or one file and corresponding inode data related to filesystem administration information, and wherein one or more attributes of a file are stored in that directory that contains the file itself;

storing one or more metrics at a directory on a direct path between a root directory and the directory that contains the one or more files affected by the change, wherein the one or more metrics are stored in each directory's associated inode data and each metric includes a value representing a summary of the one or more attributes of each file contained by one or more descendant directories of a subtree in the hierarchical tree, and wherein the subtree is based on the direct path between the directory and the root directory;

updating the values representing the summary for the one or more metrics stored in each directory's inode data on the direct path to reflect one or more alterations to one or more attributes of the one or more files contained by the directories of the subtree resulting from the change; and sampling for at least one of the one or more attributes of each file stored in each directory of the hierarchical tree, wherein the sampling is weighted based on the one or more metrics stored in each directory's inode data that is associated with each sampled file attribute.

2. The method of claim 1, further comprising:

maintaining a reconciled value and an unreconciled value associated with the one or more attributes of the one or more files contained by the one or more directories of the subtree resulting from the change, wherein the reconciled value corresponds to a value of an attribute reflected in a parent directory of each filesystem object corresponding to each directory of the subtree and the unreconciled value corresponds to a current value of the attribute reflected in each of these filesystem objects that correspond to directories of the subtree; and updating the unreconciled value for the attribute to reflect the one or more alterations to that attribute in the corresponding filesystem object.

3. The method of claim 1, further comprising:

in response to each update to the one or more directories' file system objects on the direct path, updating an unreconciled value for an attribute to equal a reconciled value in the filesystem object.

4. The method of claim 1, wherein each metric value for the one or more files included in each filesystem object are updated asynchronously.

5. The method of claim 1, wherein each metric value of the directory is updated asynchronously with respect to the received change to the one or more files contained in the directory.

6. The method of claim 1, wherein a currency of each metric value is determined by checking whether a set of filesystem objects that includes the directory or each descendant directory on the direct path requires updating based on the change to the one or more files.

7. The method of claim 1, wherein each metric value of a directory includes any one or more of a total directory count under a directory, a total file count under a directory, a total number of write operations on files contained in a directory, a moving sum of write operations on files contained in a directory, a total number of blocks used for file data, a moving sum of blocks used for file data, calendar time (ctime), and access time (atime).

8. A system for managing metrics for a filesystem over a network, comprising:
a memory that stores instructions;
a transceiver to manage communication over the network; and
one or more processors that execute the instructions to perform actions, comprising:
receiving one or more changes affecting one or more files contained by a directory in a hierarchical tree of filesystem objects, wherein each filesystem object includes one directory or one file and corresponding Mode data related to filesystem administration information, and wherein one or more attributes of a file are stored in that directory that contains the file itself;
storing one or more metrics at a directory on a direct path between a root directory and the directory that contains the one or more files affected by the change, wherein the one or more metrics are stored in each directory's associated inode data and each metric includes a value representing a summary of the one or more attributes of each file contained by one or more descendant directories of a subtree in the hierarchical tree, and wherein the subtree is based on the direct path between the directory and the root directory;
updating the values representing the summary for the one or more metrics stored in each directory's inode data on the direct path to reflect one or more alterations to one or more attributes of the one or more files contained by the directories of the subtree resulting from the change; and
sampling for at least one of the one or more attributes of each file stored in each directory of the hierarchical tree, wherein the sampling is weighted based on the one or more metrics stored in each directory's inode data that is associated with each sampled file attribute.

9. The system of claim 8, further comprising:
maintaining a reconciled value and an unreconciled value associated with the one or more attributes of the one or more files contained by the one or more directories of the subtree resulting from the change, wherein the reconciled value corresponds to a value of an attribute reflected in a parent directory of each filesystem object corresponding to each directory of the subtree and the unreconciled value corresponds to a current value of the attribute reflected in each of these filesystem objects that correspond to directories of the subtree; and
updating the unreconciled value for the attribute to reflect the one or more alterations to that attribute in the corresponding filesystem object.

10. The system of claim 8, further comprising:
in response to each update to the one or more directories' file system objects on the direct path, updating an unreconciled value for an attribute to equal a reconciled value in the filesystem object.

11. The system of claim 8, wherein each metric value for the one or more files included in each filesystem object are updated asynchronously.

12. The system of claim 8, wherein each metric value of the directory is updated asynchronously with respect to the received change to the one or more files contained in the directory.

13. The system of claim 8, wherein a currency of each metric value is determined by checking whether a set of filesystem objects that includes the directory or each descendant directory on the direct path requires updating based on the change to the one or more files.

14. The system of claim 8, wherein each metric value of a directory includes any one or more of a total directory count under a directory, a total file count under a directory, a total number of write operations on files contained in a directory, a moving sum of write operations on files contained in a directory, a total number of blocks used for file data, a moving sum of blocks used for file data, calendar time (ctime), and access time (atime).

15. A computer-readable non-transitory storage medium that includes a plurality of instructions, wherein execution of the instructions by one or more processors performs actions, comprising:
receiving one or more changes affecting one or more files contained by a directory in a hierarchical tree of filesystem objects, wherein each filesystem object includes one directory or one file and corresponding Mode data related to filesystem administration information, and wherein one or more attributes of a file are stored in that directory that contains the file itself;
storing one or more metrics at a directory on a direct path between a root directory and the directory that contains the one or more files affected by the change, wherein the one or more metrics are stored in each directory's associated inode data and each metric includes a value representing a summary of the one or more attributes of each file contained by one or more descendant directories of a subtree in the hierarchical tree, and wherein the subtree is based on the direct path between the directory and the root directory;
updating the values representing the summary for the one or more metrics stored in each directory's Mode data on the direct path to reflect one or more alterations to one or more attributes of the one or more files contained by the directories of the subtree resulting from the change; and
sampling for at least one of the one or more attributes of each file stored in each directory of the hierarchical tree, wherein the sampling is weighted based on the one or more metrics stored in each directory's inode data that is associated with each sampled file attribute.

16. The computer readable non-transitory medium of claim 15, further comprising:
maintaining a reconciled value and an unreconciled value associated with the one or more attributes of the one or more files contained by the one or more directories of the subtree resulting from the change, wherein the reconciled value corresponds to a value of an attribute reflected in a parent directory of each filesystem object corresponding to each directory of the subtree and the unreconciled value corresponds to a current value of the attribute reflected in each of these filesystem objects that correspond to directories of the subtree; and updating the unreconciled value for the attribute to reflect the one or more alterations to that attribute in the corresponding filesystem object.

17. The computer readable non-transitory medium of claim 15, further comprising:

in response to each update to the one or more directories' file system objects on the direct path, updating an unreconciled value for an attribute to equal a reconciled value in the filesystem object.

18. The computer readable non-transitory medium of claim 15, wherein each metric value for the one or more files included in each filesystem object are updated asynchronously.

19. The computer readable non-transitory medium of claim 15, wherein each metric value of the directory is updated asynchronously with respect to the received change to the one or more files contained in the directory.

20. The computer readable non-transitory medium of claim 15, wherein a currency of each metric value is determined by checking whether a set of filesystem objects that includes the directory or each descendant directory on the direct path requires updating based on the change to the one or more files.

21. The computer readable non-transitory medium of claim 15, wherein each metric value of a directory includes any one or more of a total directory count under a directory, a total file count under a directory, a total number of write operations on files contained in a directory, a moving sum of write operations on files contained in a directory, a total number of blocks used for file data, a moving sum of blocks used for file data, calendar time (ctime), and access time (atime).

* * * * *